United States Patent Office 3,245,073
Patented Apr. 5, 1966

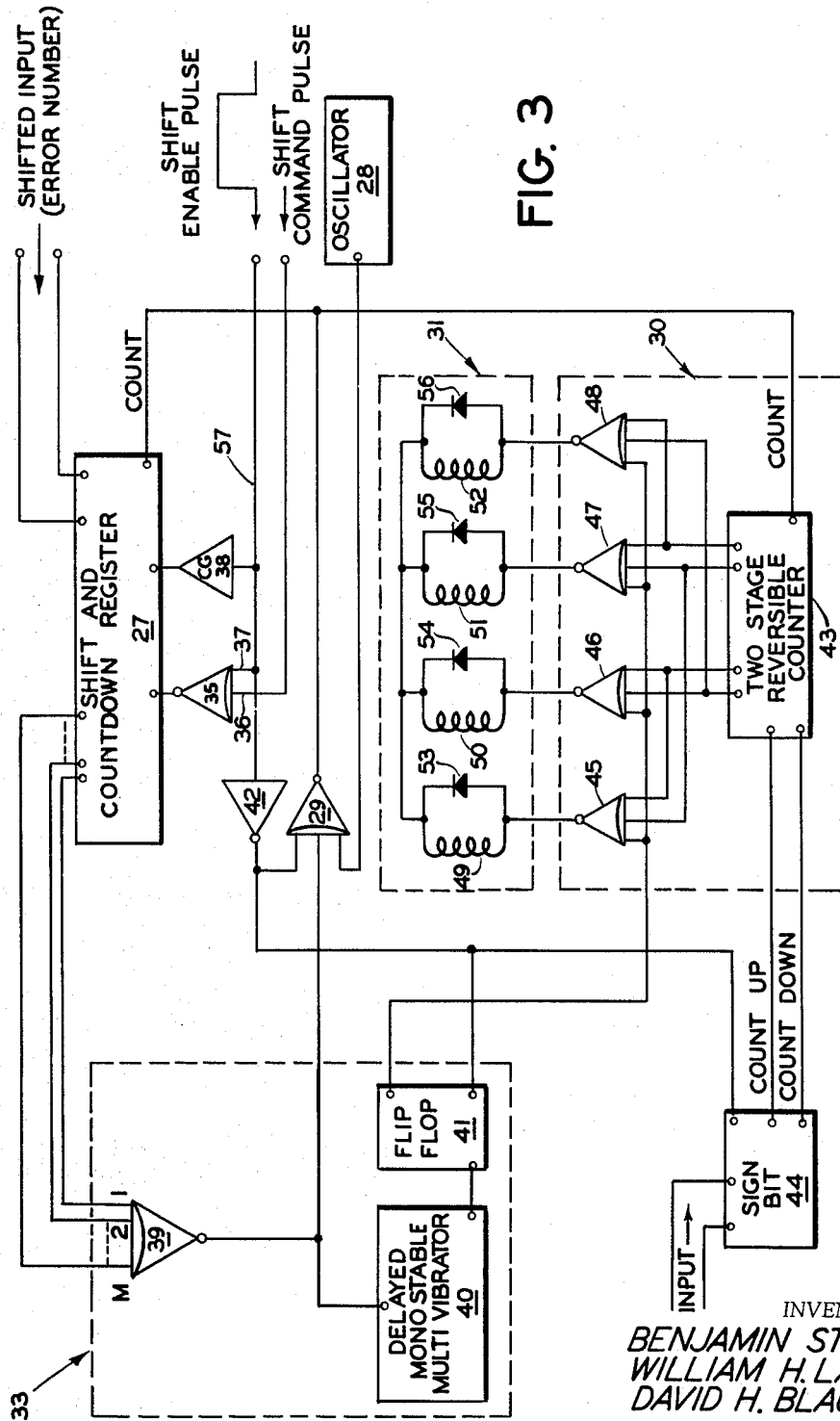

3,245,073
SAMPLED-DATA SERVO WITH STABILIZING INNER LOOP
Benjamin Strunk, Clifton, William H. Lasch, Hasbrouck Heights, and David H. Blauvelt, Ridgewood, N.J., assignors to The Bendix Corporation, Teterboro, N.J., a corporation of Delaware
Filed Dec. 12, 1962, Ser. No. 244,192
16 Claims. (Cl. 340—347)

This invention relates broadly to sampled-data servomechanisms, and more particularly to a novel means of overcoming instability in a sampled-data servo by utilizing an inner loop.

Previously, sampled-data servos suffered from instability problems, because they oscillated due to lags inherent in sampling. To overcome this instability, a novel digital inner loop has been conceived and developed.

Therefore it is a primary object of this invention to eliminate instability in sample-data servos.

Another object of this invention is to prevent oscillations or overshoot in a sampled-data servo by stopping the servo when it reaches zero or null, without waiting for the next sample.

Another object of the invention is to prevent oscillations or overshoot in a sampled-data servo by utilizing an inner loop and a stepper motor.

Another object of this invention is to provide a novel method of sensing a null or zero by utilizing an $n$-input NAND circuit.

Another object of this invention is to provide a novel method of reducing power applied to a servo to zero.

The invention contemplates a sampled-data servo comprising means for producing a signal corresponding to the desired position of an output shaft, a subtractor receiving one signal from said means and a second signal representative of the actual position of the output shaft, gating means, a pulse generator connected to a first input of the gating means, circuit means receiving an error number signal from the subtractor and applying it to a second input of the gating means until the error number reaches zero, a stepper motor driving the output shaft, and a power driver circuit receiving the pulse generator signal from the gating means and connected to the stepper motor. The pulse generator pulses the power driver circuit through the gating means for advancing the motor one step with each output pulse, and also pulses the means receiving the error signal produced by the subtractor through the gating means, for removing the error number signal from the second input of the gating means when the error number reaches zero.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawing is for illustration purposes only and is not to be construed as defining the limits of the invention.

In the drawings:

FIGURE 3 is a detailed circuit diagram partially in block form, showing the specific details of the inner loop 34 of FIGURE 2.

FIGURE 4a illustrates operation of a NAND circuit used in the invention.

FIGURE 4b illustrates operation of an inverter circuit used in the invention.

Figure 1:
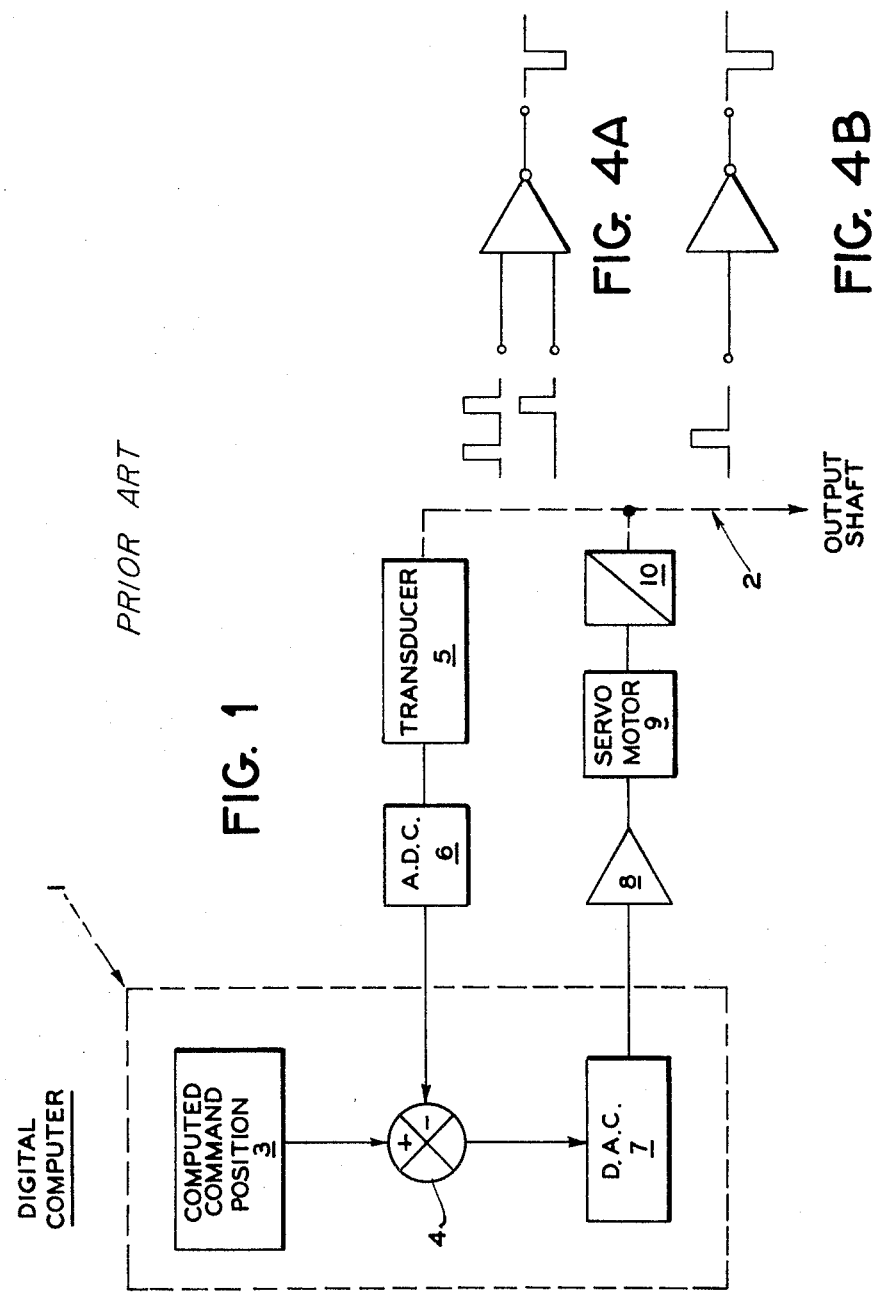
FIGURE 1 is a block diagram of an ordinary sampled-data servo as used heretofore.

Referring first to the prior are system shown in FIGURE 1, a digital computer 1 computes the desired position of an output shaft 2 and applies a digital signal, representative of this position, from a computed command position output 3 of the computer to a digital subtractor 4. An analog feedback signal representative of the actual position of the output shaft is fed from a transducer 5 to an analog to digital converter 6, and thence in digital form to the digital subtracaor 4. Transducer 5 is of the mechanical to electrical variety, and produces an electrical analog signal corresponding to the mechanical position of the output shaft. Analog to digital converter 6 changes the form of the signal from electric analog to digital in a manner well known in the art.

In digital subtractor 4, the feedback digital signal, or number, is subtracted from the computed command position signal, or number, resulting in a digital error number signal. This digital error number signal is applied to a digital to analog converter 7 where it is converted into an analog error voltage in a manner well known in the art. The analog voltage thus produced is then amplified through a servo amplifier 8 and fed to a servo motor 9, which drives the output shaft through a mechanical coupling, such as a gearing 10, towards the command position. When the digital signal representative of the computed command position is equal to the digital signal output of analog to digital converter 6, the digital error number signal is zero, and no voltage is applied to servo motor 9. The servo is now at null.

It should be noted that in the system illustrated by FIGURE 1, the steps of computing and applying the command position signal, producing the digital error number, and converting the digital error number to analog form are performed intermittently (or sampled) by the digital computer, while the steps of amplifying the error voltage to drive the servomotor, transducing the position of the output shaft into an analog voltage, and converting this analog voltage to a digital voltage, are performed continuously.

Figure 2:
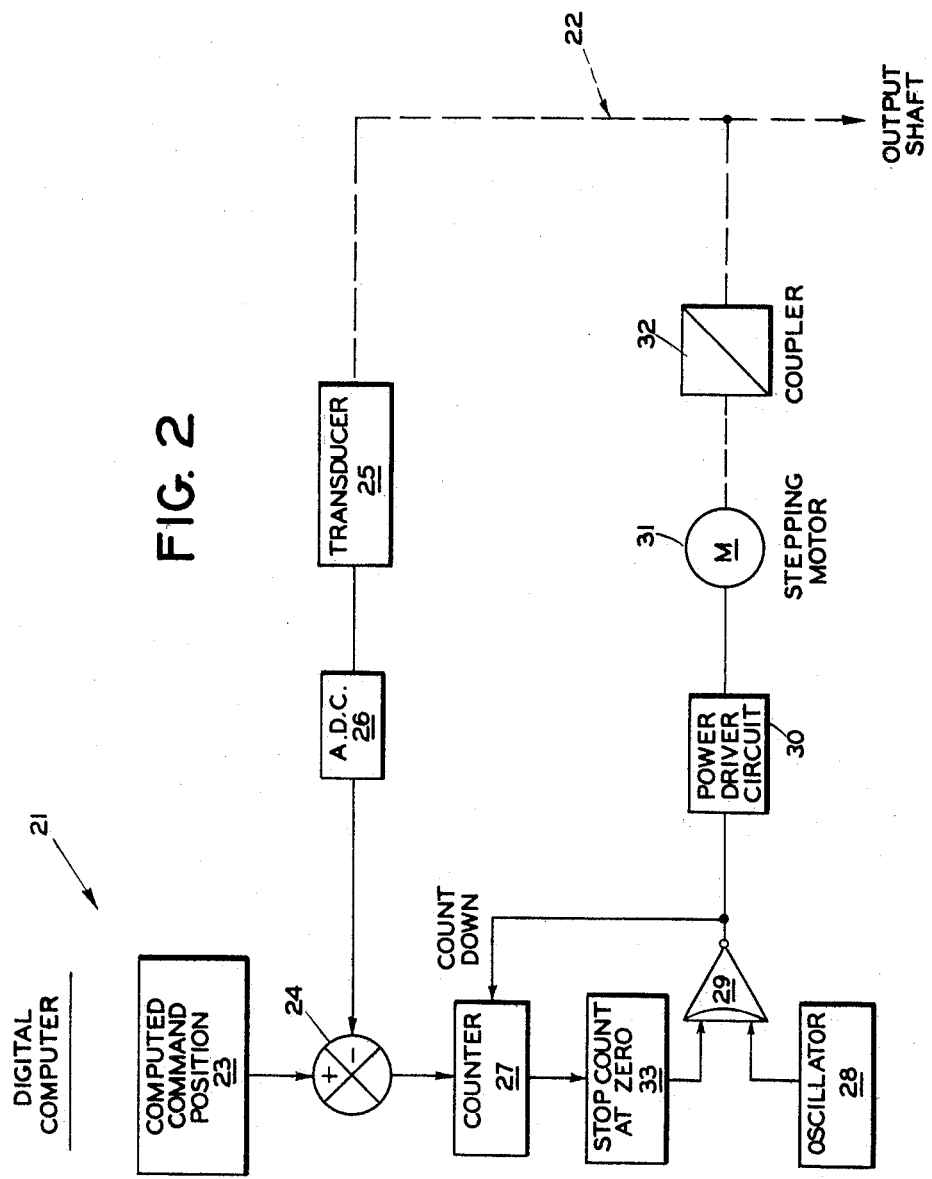
FIGURE 2 is a block diagram of the preferred embodiment of the new stabilized sampled-data servo constructed according to the present invention.

Referring now to FIGURE 2, the computer 21 computes the desired position of the output shaft 22 and feeds from its computed command position output 23 a digital signal, representative of this position, to a digital subtractor 24 which may be of the kind described at pages 363 to 365 of Digital Computer Fundamentals by Yaohan Chu, published by McGraw-Hill, 1962. An analog feedback signal representative of the actual position of the output shaft is fed from transducer 25 to analog to digital converter 26, and thence in digital form to digital subtractor 24. Here the feedback digital signal, or number, is subtracted from the computed command position signal, or number, resulting in a digital error number which is fed to a counter 27, where it is stored. Analog-to-digital converter 26 may be of the kind described in "Notes on Analog-to-Digital Conversion Techniques" by Alfred Susskind, published jointly by Technology Press of Massachusetts Institute of Technology and John Wiley and Sons. Specific reference is directed to the section on phase shift coders, pages 6–8 to 6–20, and particularly to FIGURE 6–3. Counter 27 may be of the kind described at pages 371 to 376 of Digital Computer Fundamentals by Yaohan Chu, published by McGraw-Hill, 1962.

An oscillator 28 is connected through a NAND circuit 29 to a counter 27, and to an input of a power driver circuit 30 which drives a stepper motor 31. The stepper motor drives output shaft 22 through coupler 32 towards the command position. The output of counter 27 is fed through a stop-count-at-zero circuit 33 to a second input of NAND circuit 29. NAND circuit 29 functions as a gating circuit and produces an output pulse of one polarity each time an input pulse of the opposite polarity is applied to all the inputs of the NAND circuit. Operation of the NAND gate is shown graphically in FIGURE 4a. Although a NAND gate is shown in the circuit, an AND gate or other gating means could be used.

Operation of the inner loop, comprising counter 27, stop-count-at-zero circuit 33, oscillator 28, and NAND circuit 29, is as follows. Assume that the desired position of output shaft 22 is different from its actual position resulting in a digital error number being fed to counter 27 where it is stored. The signal representative of this stored number is fed to one of the NAND circuit inputs through stop-count-at-zero circuit 33. The output of oscillator 28 is fed to the other input of NAND circuit 29. Thus, NAND circuit 29 is in its enabled condition, and oscillator 28 sends pulses into power driver circuit 30, and into counter 27, counting it down. With each output pulse from the oscillator, stepper motor 31 advances one step while counter 27 counts down one step. When the stepper motor drives output shaft 22 to its desired position, the digital error number stored in counter 27 has reached zero. At this point, stop-count-at-zero circuit 33 disables NAND circuit 29, stopping pulses produced by oscillator 28 from passing through the gate 29. This stops both the stepper motor 31 and the counter 27.

Referring next to FIGURE 3 for additional detail of the circuit, a NAND circuit 35 having a pair of inputs 36 and 37 and a current gate 38 both having a common lead 57 are connected to the inputs of a shift and count-down register or counter 27. A shifted input signal, the digital error number, is also applied to counter 27. Output of counter 27 is applied to stop-count-at-zero circuit 33, which comprises an n-input NAND circuit 39 receiving the signal from counter 27 and providing an output to a delayed monostable multivibrator 40. Multivibrator 40 is connected to one input of a flip-flop circuit 41, the output of which constitutes the output of the stop-count-at-zero circuit 33. NAND circuit 29 receives an input from n-input NAND circuit 39, and an input from oscillator 28. The input to current gate 38 and to input 37 of NAND circuit 35 is also connected to the input of an inverter circuit 42. Operation of inverter 42 in reversing polarity of an applied signal, is illustrated in FIGURE 4b. Output of inverter 42 provides a third input to NAND circuit 29, a second input to flip-flop circuit 41 for changing the state of the flip-flop, and an input to a sign bit or storage register 44 for transferring the sign of the error number. Storage register 44 feeds a two stage reversible counter 43 which forms a part of the power driver circuit 30 with a count up or count down signal depending upon the condition of the sign bit. The output of NAND circuit 29 is applied to both counters 27 and 43, thereby applying pulses from oscillator 28 to the counters. In power driver circuit 30, a plurality of power NAND circuits, shown here as four NAND circuits 45, 46, 47 and 48 are fed by the counter 43. NAND circuits 45, 46, 47 and 48 are connected to windings 49, 50, 51, and 52 respectively, of the stepper motor 31, and stepper motor windings 49, 50, 51, and 52 are shunted by diodes 53, 54, 55, and 56, respectively, for damping out induced transients in the stepper motor windings. Power NAND's 45, 46, 47, and 48 are controlled by the output of flip-flop circuit 41, which is applied to an input of each of the power NAND's, thereby enabling or disabling the NAND circuits connected to the stepper motor windings.

Operation of the circuit as shown in FIGURE 3 is as follows:

Assume a shift enable pulse is applied to the inputs of current gate 38, NAND circuit 35, and inverter 42. This enables the shift of counter 27 through current gate 38, enables NAND circuit 35 so that shift command pulses applied to input 36 of NAND circuit 35 may get through, and disables NAND circuit 29 through inverter 42 so that pulses produced by oscillator 28 cannot get through NAND circuit 29. The positive-going voltage at the beginning of the shift enable pulse is inverted through inverter circuit 42 into a negative-going voltage applied to the sign bit 44, thereby transferring the sign of the error number into the sign bit. At the same time, a negative-going voltage applied to flip-flop circuit 41 by inverter 42 changes the state of the flip-flop thereby increasing output voltage of the flip-flop. This enables all four power NAND's 45, 46, 47, and 48, thereby energizing one of motor windings 49, 50, 51, and 52.

Shift command pulses are then applied to input 36 of NAND circuit 35, shifting the error number into counter 27. After the shift enable pulse passes, voltage on line 57 drops, enabling pulses from oscillator 28 to get through NAND circuit 29 to both counters 27 and 43. Counter 27 starts to count toward zero and counter 43 counts up or down depending upon the condition of the sign bit.

NAND 45 is connected so that it energizes winding 49 with the number 00 in counter 43. NAND 46 is connected so that it energizes winding 50 with the number 01 in the counter. NAND 47 energizes winding 51 with the number 10 in the counter, and NAND 48 energizes winding 52 with the number 11 in the counter. With this scheme, sign bit 44, reversible counter 43, power NAND circuits 45, 46, 47, and 48, and motor windings 49, 50, 51, and 52 act as a reversible ring counter, which is well known in the art.

When the error number is counted down to zero, output voltage from NAND 39 drops to a low value, disabling NAND 29 so that pulses from oscillator 28 cannot get through NAND 29. At the same time, output of the delayed monostable flip-flop circuit 40 increases. After a predetermined time interval beginning at the instant the output of monostable flip-flop 40 goes high, such as 0.1 second, output of the delayed monostable flip-flop 40 drops, thereby triggering flip-flop 41. This decreases output voltage of flip-flop 41, thereby disabling power NAND circuits 45, 46, 47, and 48, and thus shutting off all power to stepper motor 31. Magnetic detent action of the stepper motor then locks the motor rotor in place. The predetermined time delay of 0.1 second in shutting off power to the motor is required for settling time. Counter 43 holds the last number that was in it so that when the power NAND's 45, 46, 47, and 48 are enabled, the same motor winding will be energized, thereby starting the motor from the same place.

The device provides means for eliminating instability in sampled-data servos. It prevents oscillations or overshoot in a sampled-data servo by stopping the servo when it reaches zero or null, without waiting for the next sample, by means of an inner loop plus a stepper motor. The device provides a novel method of sensing a null or zero by utilizing an n-input NAND circuit, and provides a novel method of reducing the power to a servo to zero.

Although but one embodiment of the invention has been illustrated and described in detail, it is to be expressly understood that the invention is not limited thereto. Various changes can be made in the design and arrangement of the circuit without departing from the spirit and scope of the invention as the same will now be understood by those skilled in the art.

What is claimed is:

1. A sample data servo for providing an output in accordance with a digital signal, comprising a counter responsive to the digital signal, a stop-count-at-zero circuit connected to the counter, an oscillator for providing pulses, a power driver circuit, a stepper motor connected to the power driver circuit and energized thereby, and gating means having a first input connected to the stop-count-at-zero circuit and a second input connected to the oscillator and having an output connected to the counter and to the power driver circuit, the gating means applying pulses from the oscillator to the counter for counting the pulses and to the power driver circuit for operating the motor to provide an output in accordance with the digital signal.

2. A sample data servo comprising a source of digital information for providing a digital signal corresponding to the desired position of an output shaft, feedback means connected to the output shaft for providing a digital signal corresponding to the actual position of the output shaft, a digital subtractor connected to the source of digital information and feedback means to provide a digital error signal corresponding to the difference between the desired and actual output shaft position signals, a counter connected to the digital subtractor and responsive to the digital error signal, a stop-count-at-zero circuit connected to the counter, an oscillator for providing pulses, a power driver circuit, a stepper motor driving the output shaft and connected to the power driver circuit and energized thereby, and gating means having a first input connected to the stop-count-at-zero circuit and a second input connected to the oscillator and having an output connected to the counter and to the power driver circuit, the gating means applying pulses from the oscillator to the counter for counting the pulses and to the power driver circuit for operating the motor to drive the output shaft to the desired position.

3. A system of the kind described comprising a counter having an input and an output, means for providing pulses, a stepper motor having an output, a gating circuit having one input connected to the counter output and a second input connected to the pulse means and having an output connected to the stepper motor and to the counter input, the gating circuit being controlled by the counter and passing pulses from the pulse means to the stepper motor for driving the motor and to the counter for counting down the counter, and means connected to the counter input for providing digital signals corresponding to the desired stepper motor output.

4. A system of the kind described comprising a counter having an input and an output, means for providing pulses, a stepper motor having an output, a gating circuit having one input connected to the counter output and a second input connected to the pulse means and having an output connected to the stepper motor and to the counter input, the gating circuit being controlled by the counter and passing pulses from the pulse means to the stepper motor for driving the motor and to the counter for counting down the counter, a source of digital information for providing digital signals corresponding to the desired stepper motor output, means connected to the stepper motor output for providing digital signals corresponding to the actual stepper motor output, and means connecting the source and the last-mentioned signal means to the counter input to provide signals at the counter output corresponding to the difference between the actual and desired stepper motor outputs.

5. A system of the kind described comprising a counter having an input and an output, a stop-count-at-zero circuit connected to the counter output, means for providing pulses, a stepper motor having an output, a gating circuit having one input connected to the stop-count-at-zero circuit and a second input connected to the pulse means and having an output connected to the stepper motor and to the counter input, the gating circuit being controlled by the counter and passing pulses from the pulse means to the stepper motor for driving the motor and to the counter for counting down the counter, a source of digital information for providing digital signals corresponding to the desired stepper motor output, means connected to the stepper motor output for providing digital signals corresponding to the actual stepper motor output, and means connecting the source and the last-mentioned signal means to the counter input to provide signals at the counter output corresponding to the difference between the acutal and desired stepper motor output signals.

6. A servo system comprising a source of digital information for providing a digital signal corresponding to the desired position of an output shaft, means connected to the output shaft for providing a digital signal corresponding to the actual position of the output shaft, a counter connected to the source and to the means and responsive to the digital signals therefrom, means for providing pulses, a stepper motor driving the output shaft, and a gating circuit having a first input connected to the counter and a second input connected to the pulse means and having an output connected to the counter and to the stepper motor, the gating circuit applying pulses from the pulse means to the counter for counting the pulses and to the stepper motor to drive the output shaft to the desired position.

7. A servo system comprising a source of digital information for providing a digital signal corresponding to the desired position of an output shaft, means connected to the output shaft for providing a digital signal corresponding to the actual position of the output shaft, a digital subtractor connected to the source and to the feedback means and providing a digital error signal corresponding to the difference between the desired and actual position signal, a counter connected to the digital subtractor and responsive to the digital error signal, a stop-count-at-zero circuit connected to the counter, means for providing pulses, a stepper motor driving the output shaft, and a gating circuit having a first input connected to the stop-count-at-zero circuit and a second input connected to the pulse means and having an output connected to the counter and to the stepper motor, the gating circuit applying pulses from the pulse means to the counter for counting the pulses and to the stepper motor to drive the output shaft to the desired position.

8. A servo system comprising a source of digital information for providing a digital signal corresponding to the desired position of an output shaft, means connected to the output shaft for providing a digital signal corresponding to the actual position of the output shaft, a digital subtractor connected to the source and to the feedback means providing a digital error signal corresponding to the difference between the actual and desired position signals, a counter connected to the digital subtractor and responsive to the digital error signal, a stop-count-at-zero circuit connected to the counter, means for providing pulses, a power driver circuit, a stepper motor connected to the power driver circuit and driving the output shaft, and a gating circuit having a first input connected to the pulse means and having an output connected to the counter and to the power driver circuit, the gating circuit applying pulses from the pulse means to the counter for counting the pulses and to the stepper motor to drive the output shaft to the desired position.

9. A system for controlling the output of a servo, comprising first means for providing signals corresponding to the desired output, second means connected to the servo output for providing signals corresponding to the actual output, means for combining the signal connected to the first and second means to provide an error signal, a gate having an output connected to the servo and having first and second inputs, pulse means connected to the first gate input, circuit means for controlling the gate having an output connected to the second gate input and having an input connected to the combining means and to the gate output and responsive to the error signal and to pulses from the pulse means, and the gate being arranged to pass pulses from the pulse means to the circuit means to nullify the error signal and to the servo to drive the servo to the desired output.

10. A servo system comprising means for providing a signal corresponding to the desired position of an output shaft, means connected to the output shaft for providing a feedback signal corresponding to the actual position of the output shaft, means connected to the source and to the feedback means to provide an error signal, a counter having an input connected to the error signal means and responsive to the error signal and having an output for providing an error number signal, a gate having an output connected to the counter input and having first and second inputs, a stop-count-at-zero circuit connecting the counter output to the first gate input, an oscillator for providing pulses connected to the second gate input, a stepper motor driving the output shaft and connected to the gate output, the gate being arranged to pass oscillator pulses to the counter and to the stepper motor when the error number signal is other than zero so that the oscillator pulses count the counter down one step with each pulse while advancing the motor one step with each pulse.

11. A servo system comprising means for providing a signal corresponding to the desired position of an output shaft, means connected to the output shaft for providing a feedback signal corresponding to the actual position of the output shaft, summation means connected to the source and to the feedback means to provide an error number signal, a counter having an input connected to the summation means and responsive to the error number signal and having an output, a gating circuit having a first input connected to the counter output and controlled by the counter and having an output connected to the counter input and having a second input, means for providing pulses connected to the second input of the gating circuit, a stepper motor driving the output shaft and connected to the output of the gating circuit, the gating circuit passing pulses from the pulse means to the counter to count down the error number signal and to the stepper motor to advance the output shaft when the error number signal is other than zero, and the gating circuit blocking pulses from the pulse means when the error number signal is zero.

12. A servo system comprising means for providing a signal corresponding to the desired position of an output shaft, means connected to the output shaft for providing a feedback signal corresponding to the actual position of the output shaft, summation means connected to the source and to the feedback means and providing an error signal, a counter connected to the summation means and responsive to the error signal, a stop-count-at-zero circuit connected to the counter, means for providing pulses, a stepper motor driving the output shaft, and a gating circuit having a first input connected to the stop-count-at-zero circuit and a second input connected to the pulse means and having an output connected to the counter and to the stepper motor, the gating circuit being controlled by the stop-count-at-zero circuit and supplying pulses from the pulse means to the counter for counting down the pulses to zero and to the stepper motor to drive the output shaft to the desired position.

13. A servo system comprising means for providing a signal corresponding to the desired position of an output shaft, means connected to the output shaft for providing a feedback signal corresponding to the actual position of the output shaft, summation means connected to the source and to the feedback means and providing an error signal, a counter connected to the summation means and responsive to the error signal and providing an error number corresponding thereto, a stop-count-at-zero circuit connected to the counter and responsive to the error number, an oscillator for providing pulses, a stepper motor driving the output shaft, and a NAND circuit having a first input connected to the stop-count-at-zero circuit and a second input connected to the oscillator and having an output connected to the counter and to the stepper motor, the NAND circuit providing pulses from the oscillator to the counter for counting the error number down one step with each pulse and to the stepper motor for advancing the output shaft one step with each pulse and blocking pulses from the oscillator to the stepper motor and to the counter when the error number is zero and the output shaft is in the desired position.

14. A servo system comprising means for providing a signal corresponding to the desired position of an output shaft, means connected to the output shaft for providing a feedback signal corresponding to the actual position of the output shaft, subtracting means connected to the source and to the feedback means and providing an error signal corresponding to the difference between the desired and actual position signals, a counter connected to the subtracting means and responsive to the error signal and providing an error number, a gating circuit having an output connected to the counter and first and second inputs, a stop-count-at-zero circuit connected to the counter and responsive to the error number from the counter and connected to the first input of the gating circuit and controlling the gating circuit, means for providing pulses connected to the second input of the gating circuit, a stepper motor driving the output shaft and connected to the output of the gating circuit, the gating circuit passing pulses from the pulse means to the counter to count down the error number and to the stepper motor to advance the output shaft until the error number is zero.

15. A servo system comprising a source of digital information for providing a digital signal corresponding to the desired position of an output shaft, means connected to the output shaft for providing an analog signal corresponding to the actual position of the output shaft, an analog-to-digital converter connected to the means, a digital subtractor connected to the source and to the converter and providing a digital error signal, a counter connected to the digital subtractor and responsive to the digital error signal therefrom and providing an error number signal, a pulse generator, a gating circuit having one input connected to the counter and controlled by the counter and having a second input connected to the pulse generator and having an output connected to the counter, and a stepper motor driving the output shaft and connected to the output of the gating circuit so that the pulse generator pulses the stepper motor and the counter through the gating circuit to advance the motor one step and count the counter down one step with each pulse.

16. A sampled-data servo comprising first means for producing a digital signal corresponding to the desired position of an output shaft, second means connected to the output shaft for providing a digital feedback signal corresponding to the actual position of the output shaft, digital summing means connected to said first and second means and providing a summation signal, gating means having first and second inputs and an output, a pulse generator connected to a first input of the gating means, circuit means for controlling the gating means and having an input connected to the summing means for receiving the summation signal and to an output of the gating means for receiving pulses from the pulse generator and having an output connected to a second input of the gating means, a stepper motor driving the output shaft and connected to the output of the gating means and responsive to the pulses from the pulse generator so that the output shaft of the stepper motor advances one step with each pulse to the desired position.

References Cited by the Examiner

UNITED STATES PATENTS

| | | | |
|---|---|---|---|
| 2,537,427 | 1/1951 | Seid et al. | 340—347 |
| 2,775,727 | 12/1956 | Kernahan et al. | 340—347 |
| 2,867,724 | 1/1959 | Olson | 340—347 |
| 3,078,400 | 2/1963 | Kilroy et al. | 340—347 |
| 3,099,777 | 7/1963 | Davis | 340—347 |

MALCOLM A. MORRISON, *Primary Examiner.*

L. W. MASSEY, W. J. KOPACZ, *Assistant Examiners.*